J. A. SCHARF.
MOTOR VEHICLE DRIVING GEAR.
APPLICATION FILED NOV. 2, 1911. RENEWED OCT. 21, 1912.
1,045,752.
Patented Nov. 26, 1912.
3 SHEETS—SHEET 2.
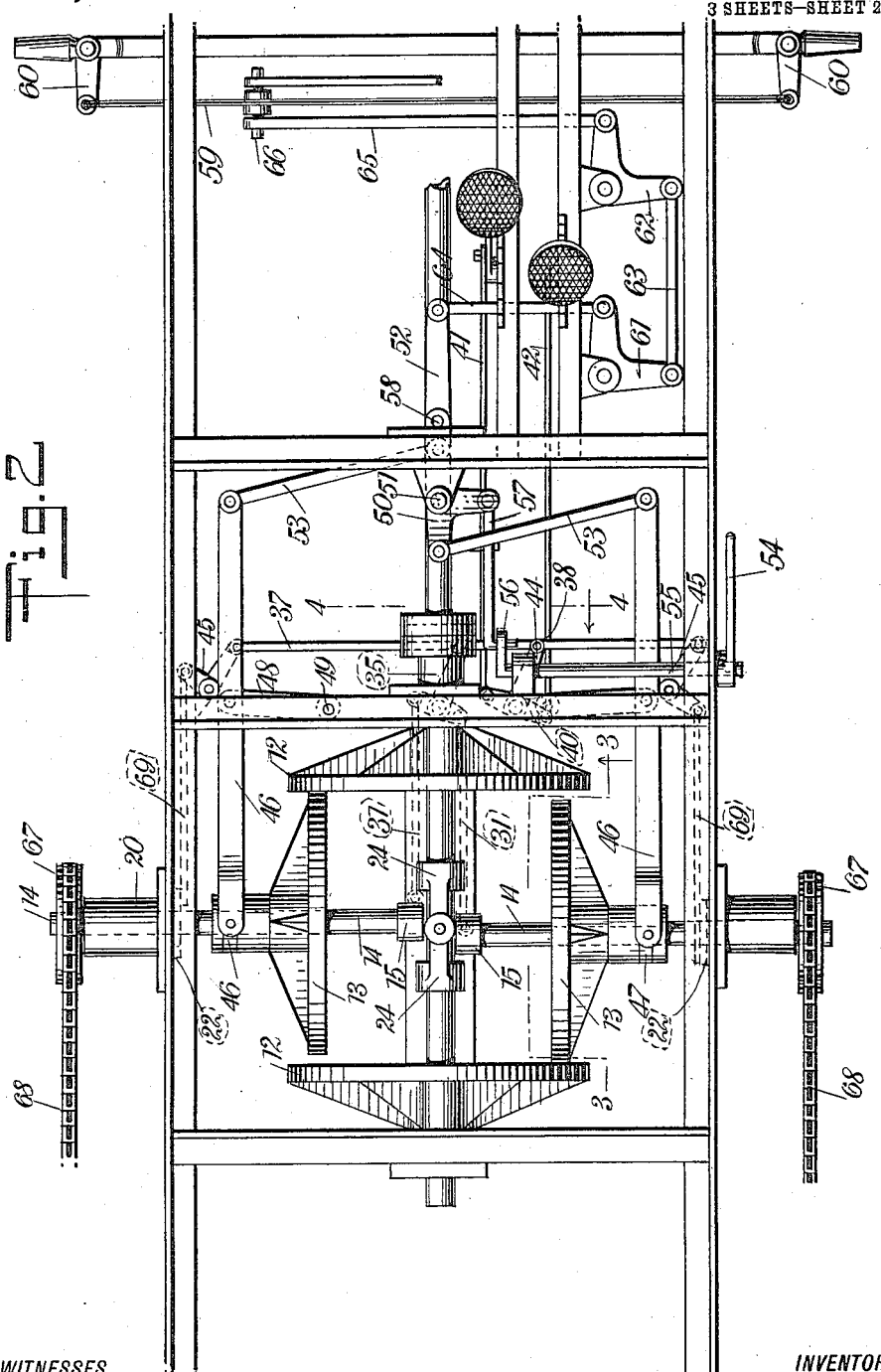
WITNESSES
INVENTOR
John A. Scharf
BY
ATTORNEYS

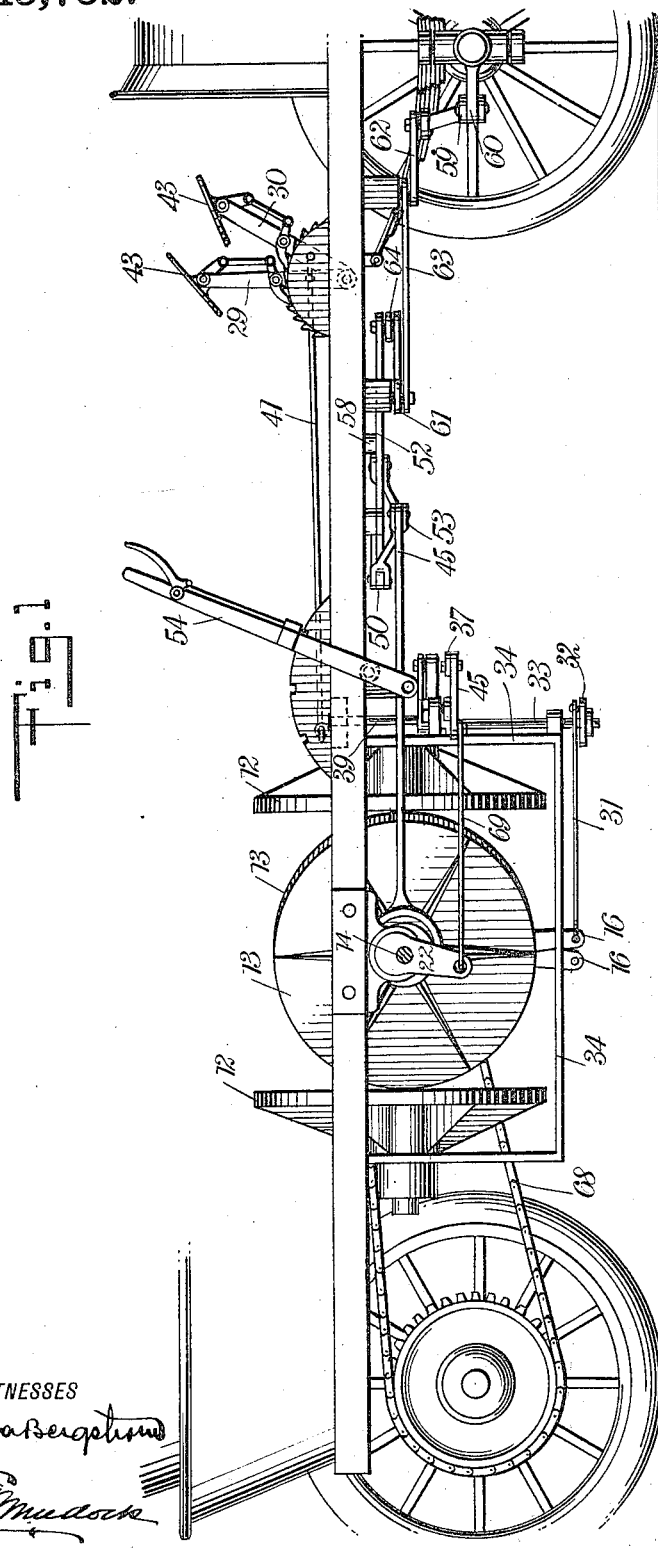

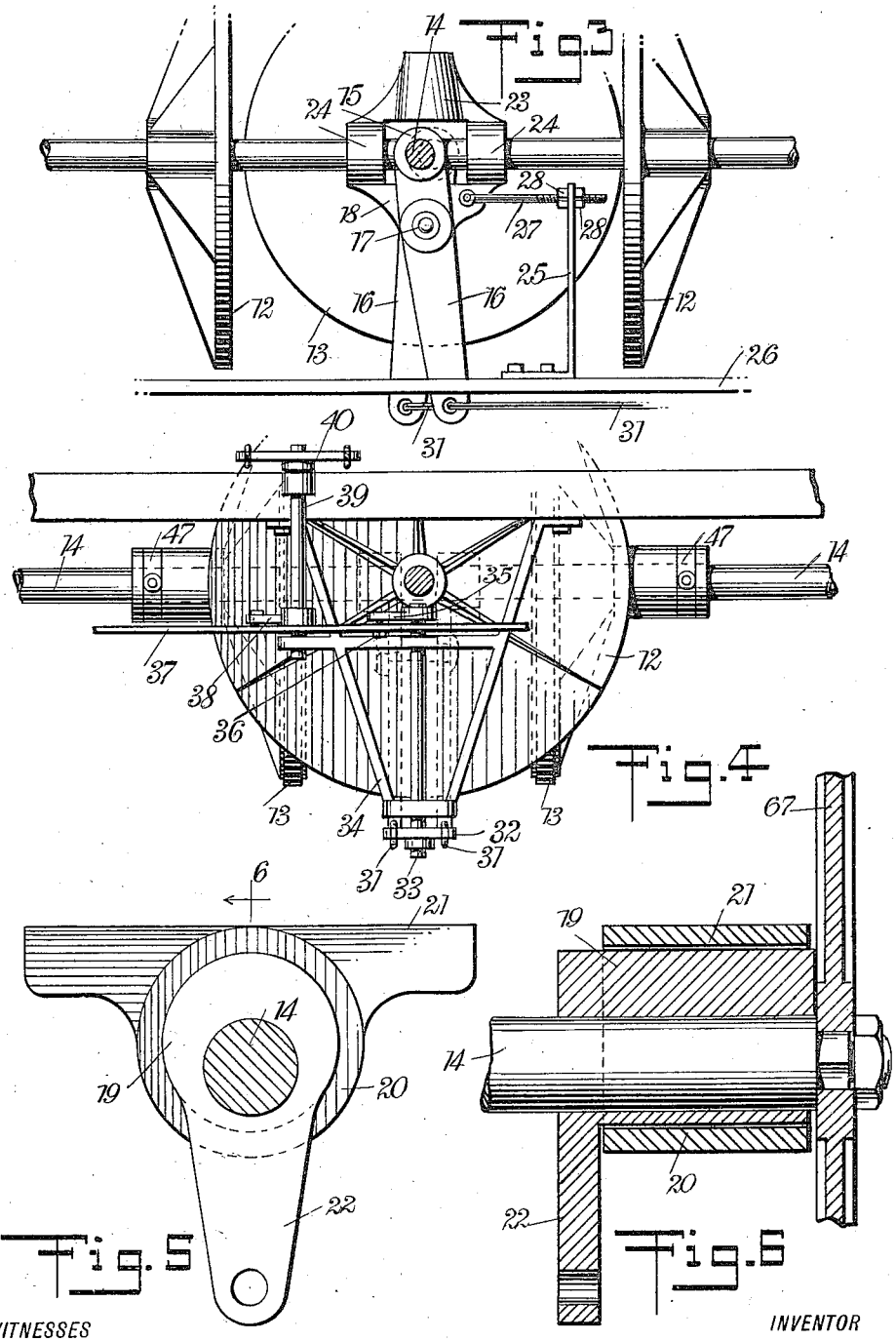

UNITED STATES PATENT OFFICE.

JOHN A. SCHARF, OF RICHWOOD, OHIO.

MOTOR-VEHICLE DRIVING-GEAR.

1,045,752. Specification of Letters Patent. Patented Nov. 26, 1912.

Application filed November 2, 1911, Serial No. 658,141. Renewed October 21, 1912. Serial No. 727,060.

*To all whom it may concern:*

Be it known that I, JOHN A. SCHARF, a citizen of the United States, and a resident of Richwood, in the county of Union and State of Ohio, have invented a new and Improved Motor-Vehicle Driving-Gear, of which the following is a full, clear, and exact description.

The present invention relates particularly to improvements in a mechanism disclosed in a patent entitled driving gear for automobiles, granted to me November 8, 1910, bearing No. 975,290, to which patent cross reference is here made.

The principal objects which the present invention has in view are: to provide in a mechanism employing a plurality of driving friction disks and a plurality of movable transmission wheels operatively engaged therewith, means for shifting the said wheels to engage and disengage the said disks in planes perpendicular to said disks whereby the extreme width of the friction surface of the wheels is made effective; to provide a simplified mechanism for shifting the said disks for varying the speed of transmission and for discontinuing the same; and to provide a simplified means for varying the speed of the transmission mechanism on opposite sides of the vehicle to produce an effect similar to that obtained when employing a differential mechanism while following a curved path.

One embodiment of the present invention is disclosed by the structure illustrated in the accompanying drawings, in which like characters of reference denote corresponding parts in all the views, and in which—

Figure 1 is a side view of a driving gear constructed and arranged in accordance with the present invention, and shown in its application to an automobile; Fig. 2 is a top plan view of the same; Fig. 3 is a vertical section on an enlarged scale, the section being taken on the line 3—3 in Fig. 2; Fig. 4 is a vertical cross section on an enlarged scale, the section being taken on the line 4—4 in Fig. 2; Fig. 5 is a detail view on an enlarged scale, showing the mounting for one of the transmission shafts employed in the present invention; and Fig. 6 is a detail view in vertical section taken on the line 6—6 in Fig. 5.

While the present invention is herein shown and described in its application to the driving mechanism of a motor vehicle, it will be understood that certain features of the mechanism are applicable to other forms of machines; and particularly is this true of the construction and arrangement of the transmission mechanism inclusive of the speed varying and disengaging devices employed herein; and the employment of these devices and mechanisms in other uses than here described is deemed by me to be within the scope of the present disclosure and claims supported thereby.

The construction and arrangement of the driving disks 12 and the wheels 13 are substantially that disclosed in the former patent above referred to. The wheels 13 in the present disclosure differ from those of the former disclosure in that the periphery of the present wheels is perpendicular to the surface of the face of the said wheels, or parallel to the surface of the disks 12. This change in the construction is accommodated by the difference in shifting the said wheels to and from engagement with said disks. In the former patent the transmission shafts 14 are disclosed as pivoted between the extremes of the shaft to swing on the pivotal mounting to and from the opposite disks 12. In the present invention the shafts 14 are journaled at the inner extremity in bearing boxes 15 formed in the upper ends of levers 16. The levers 16 are each pivoted by pins 17 set out from a pendant bracket 18, as seen best in Fig. 3 of the drawings. At the outer extremity of each shaft 14 the said shaft is journaled in a bearing block 19. The bearing block 19, as shown best in Figs. 5 and 6, is eccentric to the shaft 14. The block 19 is rotatively mounted in the boxing 20 which is provided with a bolting plate 21 whereby the said boxes are secured to the side bars of an automobile chassis. Extended from each of the blocks 19 is a pendant lever arm 22.

The bracket 18 is integrally constructed with a bearing yoke 23. Extended longitudinally from the median line of each yoke are the bearing boxes 24, as seen best in Fig. 3 of the drawings. The yoke 23 is maintained centralized between the disks 12 by a heavy spring 25, the lower end whereof is bent to form a foot which is bolted rigidly to a structural member 26 of the vehicle. The spring 25 is connected with the bracket 18 of the yoke 23 by means of a link screw 27. The threaded portion of the screw 27 is extended through a perforation suitably provided at the upper end of the spring 25. The adjustment of the screw 27 in the spring 25 is by means of set nuts 28. By the manipulation of the nut 28 on the screw 27 the normal position of the yoke 23 and the shafts 14 and wheels 13 may be varied. The yield of the spring 25 accommodates any disadjustment of the shafts 14 and wheels 13 due to the variation in the disposition of the said wheels relative the friction surface of the disks or to other accidental disarrangement.

To swing the shafts 14 and wheels 13 mounted thereon between the disks 12, 12 the levers 16 and arm 22 connected with each shaft are equally shifted lengthwise the vehicle and driving shaft thereof. Under normal conditions the shift of the two shafts 14 is equal and in opposite directions this result is obtained by manipulating the foot levers 29 and 30, the operation of one of said levers resulting in the forward movement of the vehicle, and the operation of the other of said levers resulting in the reverse or rearward movement of the vehicle. Each of the levers 16 has connected therewith at the lower end thereof a connecting rod 31. The rods 31 are each connected with a rocking lever 32 at the opposite end thereof, and on the opposite sides of the pivot shaft 33 whereon the said lever is rigidly mounted. The shaft 33 is supported in bearings formed in the supporting frame 34, as best seen in Fig. 4 of the drawings. At the upper end of the shaft 33 is secured a crank arm 35 which is pivotally connected by means of a bolt 36 to a link rod 37. The link rod 37 is likewise connected with the crank arm 38 rigidly mounted on a vertical shaft 39 at the upper end whereof is rigidly attached the rocking lever 40. The opposite ends of the lever 40 are flexibly connected with the operating rods 41 and 42. The rod 41 is pivotally connected to the lever 29. The rod 42 is connected with the lever 30. By reason of this arrangement the effect of the push on either of the pedals 43 with which the said levers are provided results differently and variously in that the crank arm 38 is rotated to the right or left as the case may be.

Each end of the link rod 37 is pivotally connected with one of the bell cranks 45. The remaining arm of each bell crank 45 is connected by the rod 69 to the lever arm 22 of the block 19. The levers 16 and lever arms 22 are constructed to provide the same amount of throw or movement of the ends of the shafts 14 mounted thereon. In this manner there is provided a mechanism whereby the wheels 13, 13 may be forced against the opposite disks 12, 12 to produce the same direction of rotation of the shafts 14, be it such as to drive the vehicle forward or backward. Also, by shifting the levers 29 and 30 the wheels 13 may be removed from both of the disks 12.

To provide the equivalent of the changed speed gear the wheels 13, 13 are slidably mounted on the shafts 14, as disclosed in the above mentioned patent, and are shifted lengthwise thereof by means of the levers 46. The levers 46 are yoked at the end adjacent the hub of the wheels 13 and are pivotally mounted to a collar 47. See Fig. 2 of the drawings. The levers are each pivotally connected with a link 48. The links 48 are pivotally connected at 49 to the body structure of the vehicle. The flexible fulcrum thus formed provides for the movement of the end of the levers 46 operatively connected with the wheels 13. The free end of each lever 46 is connected to the oppositely extended arms of a three-armed lever 50. The lever 50 is pivoted at 51 upon the end of a lever 52. To thus connect the levers 50 and 46 the link rods 53 are provided.

The flexible connection between the collars 47 and the lever 50 is such that the shafts 14, 14 may be freely moved without disturbing the said arrangement of the lever 50. When, however, the lever 50 is rocked on its pivot 51 the levers 46 are moved to carry the wheels 13 toward or away from the center of the disks 12. To thus move the lever 50 the hand lever 54 is rigidly mounted on a rocking shaft 55 at the inner end whereof is provided a crank arm 56. The crank arm 56 is connected with the lever 50 by means of the connecting rod 57. This construction is best seen in Fig. 2 of the drawings.

With this construction at his command the chauffeur moves the lever 54 to rock the lever 50 and the levers 46, 46 connected therewith, both of said last named levers moving in relatively opposite directions, and ultimates in the movement of the wheels 13 equally toward and away from the center of the disks 12, thereby varying the speed transmitted to the shafts 14.

To compensate for the usual differential to conform with the speeds of the opposite driving wheels to the needs of a vehicle when following a curved path, the lever 52 is rocked on the fulcrum 58 therefor proportionate to the swing of the connecting rod 59 which unites the crank arms 60, 60 of the steering gear of the vehicle. The transmission mechanism connecting the rod 59 with the lever 52 comprises the bell crank levers 61 and 62 and the connecting rods 63, 64 and 65. The rod 65 is pivotally connected by means of the pin 66 with the rod 59. By reference to Fig. 2 of the drawings it will be seen that to shift laterally the rod 59 rocks the levers 61 and 62 and 52. The levers 52 rocking on the fulcrum 58 shifts transverse the vehicle the pivot 51 and the lever 50. The lever 50 is prevented from rotating by the rod 57. The lateral shift therefore of the lever 50 results in moving in the same direction the levers 46, and in shifting the wheels 13, 13 between the disks 12, causing one of the said wheels to approach the center of the said disks and the other to move toward the periphery of the said disks. This movement of the disks results in the slowing of the speed of one of the shafts 14, while increasing proportionately the speed of the other of said shafts. The outer ends of the shafts 14 are each provided with a sprocket wheel 67, the chain 68 whereof is suitably connected with the driving wheels of the machine.

With a machine thus constructed and arranged the operation is as follows: In the standing position the levers 29 and 30 are each held in substantially parallel relation when the wheels 13, 13 are removed from contact with both the disks 12, 12. In this condition the motor with which the vehicle is provided is started, the driving shaft carrying the disks 12, 12 operating freely and without resistance. The chauffeur manipulates the hand lever 54 to draw the wheels 13, 13 toward each other and toward the center of the disks 12, this being the slow speed position of the said disks. By pressing on one of the pedals 43 the shafts 14 are shifted to press the periphery of the wheels 13 against the friction face of the opposite disks 12. If it is desired to move forward the lever 29 or 30 which results in this movement is selected. To increase the speed of the shafts 14 and the driving speed of the vehicle the lever 54 is manipulated to spread the wheels 13 from each other and move the same toward the periphery of the disks 12. At the extreme outer edge of the disks 12 the extreme high speed condition of the shafts 14 and the vehicle has been arrived at. The speed rate having been established the handling of the vehicle is the same as in usual vehicles. When, however, in steering, the rod 59 is moved to one side or the other to guide the wheels connected with the crank arms 60 the disks 12, 12 are shifted to conform to the variation in speed required between the shaft 14 connected with the outer and the shaft 14 connected with the inner of the driving wheels.

To stop the vehicle the levers 29 and 30 are disposed in position to aline the shafts 14, in which position the wheels 13 are disengaged from the disks 12. To reverse the machine the proper pedal 43 is pressed upon, which reverses the contact of the wheels 13 with the disks 12, imparting to the shafts 14 a rotary direction which ultimates in the rearward movement of the vehicle.

Having thus described my invention, what I claim as new and desire to secure by Letters Patent is:—

1. In a motor vehicle driving gear, wherein power is transmitted through a driving shaft and oppositely faced friction disks rigidly mounted thereon; a plurality of short transmission shafts; a plurality of cylindrical bearing blocks for said shafts having crank arms extended therefrom, said blocks being provided with bearings for said shafts eccentric to said blocks; a plurality of bearings for said blocks; a transmission mechanism operatively connecting the arms of said blocks on opposite sides of the vehicle to cause the rotation of said blocks simultaneously in opposite directions and embodying a connecting rod disposed transverse the body of said vehicle; a swinging lever operatively connected with said connecting rod; and a plurality of foot operated selective mechanisms for shifting said rod transverse the body of the vehicle, said mechanisms each disposed to shift the said rod in a direction opposite that shifted by the other of said mechanisms.

2. In a motor vehicle driving gear, wherein power is transmitted through a driving shaft and oppositely faced friction disks rigidly mounted thereon; a plurality of transmission shafts disposed perpendicular to said driving shaft; a plurality of parallel swinging supports for said transmission shafts; manually operative means for swinging said supports; a transmission mechanism connecting said shafts to cause the same to swing in opposite directions; a plurality of friction wheels each slidably mounted on one of said shafts for engagement with said disks; a shifting mechanism comprising a plurality of connected levers for sliding the said wheels on said shafts; an operating mechanism for said levers connecting the free ends thereof adapted to move the ends of said levers to and from each other; a rocking lever pivotally mounted to support said operating mechanism; a transmission mechanism connecting the said rocking lever with the steering gear of said vehicle to shift said lever in harmony with the operation of the steering gear; and manually operative means for adjusting the said operating mechanism to dispose said levers in position to vary the approximation of said wheels.

In testimony whereof I have signed my name to this specification in the presence of two subscribing witnesses.

JOHN A. SCHARF.

Witnesses:
 Geo. W. Warden,
 R. G. Cook.

Copies of this patent may be obtained for five cents each, by addressing the "Commissioner of Patents, Washington, D. C."